United States Patent

Mazur

[15] 3,697,873
[45] Oct. 10, 1972

[54] METHOD FOR DETERMINING EXCESS CARRIER LIFETIME IN SEMICONDUCTOR DEVICES

[72] Inventor: Robert G. Mazur, Monroeville, Pa.
[73] Assignee: Westinghouse Electric Corporation, Pittsburgh, Pa.
[22] Filed: May 28, 1969
[21] Appl. No.: 828,621

[52] U.S. Cl. .................. 324/158 D, 29/470.1, 228/1
[51] Int. Cl. ....................... G01r 31/22, B23k 21/00
[58] Field of Search .324/158, 158 D, 158 T; 29/573, 29/470.1, 589, 590, 574; 228/1

[56] References Cited

UNITED STATES PATENTS

| 3,250,693 | 5/1966 | Amaya | 324/158 |
| 3,366,879 | 1/1968 | Kobayashi et al. | 324/158 |
| 3,384,283 | 5/1968 | Mims | 29/470.1 X |
| 3,459,355 | 8/1969 | Metzger, Jr. | 228/1 |

OTHER PUBLICATIONS

Howard, N. R., J. Sci. Instrum. vol. 39, 1962, pages 647–648.
Kiver, M. S., Transistors, McGraw–Hill, N.Y., 3rd ed., 1962, pages 1a, 2a, 64, 65.
Lederhandler et al., Measurement of Minority . . . , Proc. of the IRE, vol. 43, April 1955, pages 477–483.

Primary Examiner—Rudolph V. Rolinec
Assistant Examiner—Ernest F. Karlsen
Attorney—F. Shapoe and C. L. Menzemer

[57] ABSTRACT

Described is a method for excess carrier lifetime testing of semiconductor materials by the use of ultrasonically soldered contacts in obtaining open-circuit voltage decay measurements. The method is particularly adapted for use in in-line production testing of semiconductor wafers and does not require the use of high temperatures to bond contacts to the wafer being tested.

1 Claim, 6 Drawing Figures

PATENTED OCT 10 1972          3,697,873
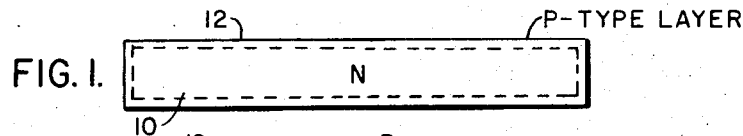
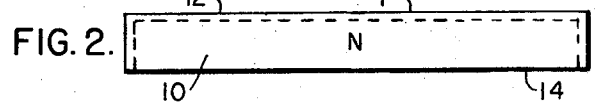
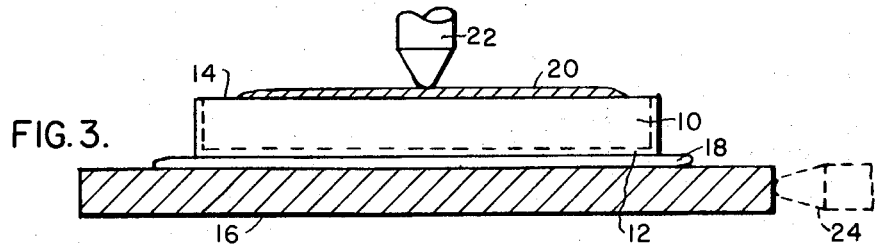
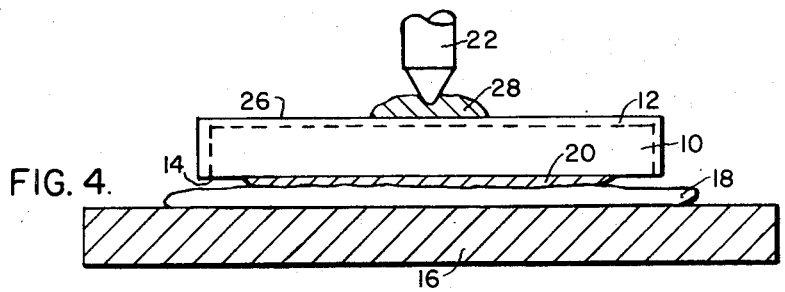
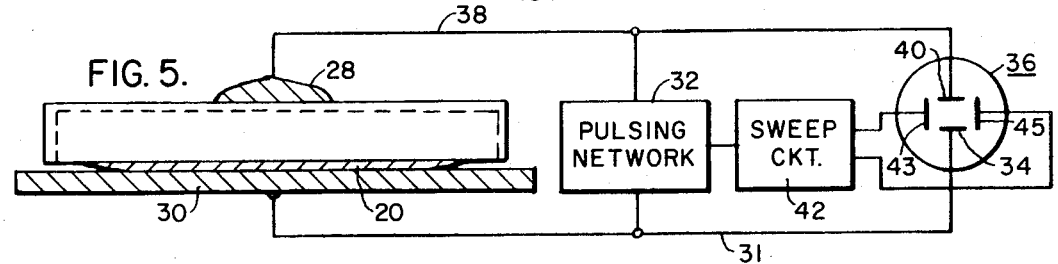
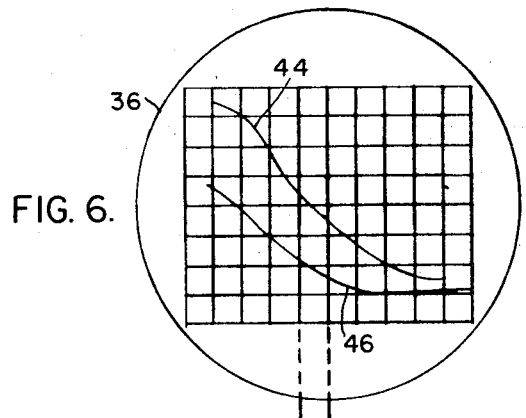
INVENTOR
Robert G. Mazur
BY
C. L. Menzemer
ATTORNEY

METHOD FOR DETERMINING EXCESS CARRIER LIFETIME IN SEMICONDUCTOR DEVICES

BACKGROUND OF THE INVENTION

As is known, the lifetime of excess carriers is a parameter of major importance in semiconductor devices which rely on minority carrier effects for their operation. Although a large number of methods have been devised for the measurement of carrier lifetime in device structures, it has not always been easy to relate the measured lifetime to one required for a particular device application, since the measurement conditions are not necessarily identical with the operating conditions of the device. Some of the difficulties are attributable to geometrical effects and to the fact that in silicon and germanium, lifetime varies with injection level, so that the lifetime measured at one injection level need not apply to another. The problem is particularly acute in high powered devices such as the thyristor which operates under extremely high injection levels in the forward conducting or ON state. Also, when the device is turned OFF, the decay of carriers through recombination covers a range in concentrations of several orders of magnitude. In the latter case, a knowledge of carrier lifetime at either high or low injection levels alone is clearly inadequate.

In the past, numerous attempts have been made to obtain reliable excess carrier lifetime measurements on semiconductor materials. However, most of these are not altogether satisfactory and are limited primarily to use in the laboratory. That is, they are not readily adaptable to production-line techniques. Most of the work that has been done on as-processed silicon has utilized some variation of the junction recovery technique which is based on the fact that a semiconductor diode exhibits a low impedance under reverse bias for some time after removal of an initial forward bias condition due to the storage of excess minority carriers in the P-N junction region. Various prior art reverse recovery techniques measure the quantity of stored charge, which is a function of lifetime, by either a direct charge measurement or by measuring the time between the application of reverse current and the rise of junction impedance to the normal reverse bias condition. However, certain inherent defects in these junction recovery techniques have prevented their adoption as a standard basic lifetime measurement technique. For example, the charge extracted in the reverse bias condition is a function of the magnitude of the forward current and of the ratio of reverse to forward current. This effect leads in actuality to the measurement of some time period which is related to the bulk lifetime by little understood formulas based on a large number of assumptions about the current flow situation in the structure being investigated (i.e., the time constant measured in the junction recovery techniques generally depends on the detailed structure involved through the effect of diffusion currents and the like). Finally, the effect of surfaces on the diodes used in junction recovery measurements is difficult to estimate under most conditions, leading to further uncertainty in the measured data.

Another method heretofore used to measure excess carrier lifetime is the carrier decay technique which is based on observing the transient forward voltage decay across a prepared mesa semiconductor diode under open-circuit conditions, after an essentially instantaneous interruption of a steady, forward current flow. By observing the voltage decay on an oscilloscope, particularly the slope of the trace produced by the decaying voltage, the characteristics of the sample being tested can be determined, such as carrier lifetime as a function of impurity concentration.

Like the reverse recovery technique, excess carrier lifetime measurements based on the carrier decay technique have been largely limited to the laboratory, since the techniques used were time-consuming and somewhat complicated for semi-skilled production personnel. Such prior art techniques ordinarily involved the use of heavily-doped alloyed or diffused contacts to the sample being tested. This, however, is undesirable, at least for production-line applications, since the high temperature associated with the alloying or diffusion process may have a deleterious effect on the base lifetime, and because the production of such contacts is excessively time-consuming and laborious. Ideally, from the point of view of simplicity, speed and adaptation to production-line techniques, pressure contacts for the sample being tested by carrier decay techniques would be ideal. The difficulty with pressure contacts, however, is that the total electrical contact area of such contacts is always much smaller than the apparent contact area. Consequently, the contact resistance is too high for practical open-circuit decay measurements.

SUMMARY OF THE INVENTION

As an overall object, the present invention seeks to provide a new and improved method for measuring excess carrier lifetime in semiconductor bodies by carrier decay techniques, which method is simple and fast and does not require high temperature treatment of the semiconductor body.

Another object of the invention is to provide a method for in-line production testing of semiconductor bodies to determine excess carrier lifetime, which method can be readily practiced by semi-skilled personnel.

Still another object of the invention is to provide a method for determining excess carrier lifetime in semiconductor bodies with the use of ultrasonically soldered contacts which present a low contact resistance and do not require exposure of the semiconductor body to high temperatures which might otherwise alter the excess carrier measurements obtained.

In accordance with the invention, a method is provided for determining excess carrier lifetime in a semiconductor body of one conductivity type into which a region of the opposite conductivity type is initially diffused to form a P-N junction. A first contact is ultrasonically soldered to a surface of said one region of one conductivity type; a second contact is ultrasonically soldered to a surface of said region of the other conductivity type; and a source of electrical pulses is connected across said contacts whereby the voltage decay following the termination of each pulse applied across the electrodes can be observed on an oscilloscope to determine excess carrier lifetime in the body of semiconductor material.

Preferably, in the ultrasonic soldering process, the body of semiconductive material is placed on a hot plate and heated to a temperature no greater than about 120° C, far below the temperatures used to produce other types of contacts. The ultrasonic wave energy acts to break up oxides on the surface of the semiconductor body and eliminates the need for high temperatures and soldering fluxes. Ordinarily, a wafer of semiconductive material of one type, say N-type, is subjected to a diffusion treatment in a furnace whereby the entire outer layer of the wafer is diffused to form a region of the other conductivity type, say P-type. Following the diffusion step, one surface of the wafer is lapped to expose the N-type material and the lapped surface covered with a layer of solder, applied by ultrasonic techniques. Following this step, the other side of the wafer, comprising the diffused P-type region, has applied thereto an ultrasonically soldered contact, preferably greater than about 0.3 square centimeter in area to minimize edge effects.

The contacts thus formed are connected to a source of pulses which, through suitable sweep circuitry, actuate the horizontal deflection plates of a conventional CRT tube. The voltage appearing across the contacts following application of a pulse is applied to the vertical deflection plates of the same tube whereby the voltage decay may be observed on the face of the CRT tube and from this the excess carrier lifetime of the material may be determined.

The above and other objects and features of the invention will become apparent from the following detailed description taken in connection with the accompanying drawings which form a part of this specification, and in which:

FIG. 1 is an illustration of a semiconductive wafer having diffused into its surface regions a layer of the opposite conductivity type;

FIG. 2 is an illustration of the wafer of FIG. 1 after having one surface thereof lapped to expose the inner, undiffused portion of the wafer and form a P-N junction;

FIG. 3 illustrates the manner in which a soldered contact is applied to one side of the wafer;

FIG. 4 illustrates the manner in which a soldered contact is applied to the other side of the wafer;

FIG. 5 is a schematic circuit diagram of suitable circuitry for determining excess carrier lifetime utilizing the ultrasonically soldered contacts shown in FIGS. 3 and 4; and FIG. 6 is a view of typical traces showing the voltage decay across the P-N junction of a semiconductor following application of a current pulse.

With reference now to the drawings, and particularly to FIG. 1, a semiconductive wafer originally of N-type material is disposed within a diffusion furnace and exposed, at high temperatures, to a P-type dopant which produces a layer 12 of P-type material entirely around the wafer 10. In the manufacture of semiconductor devices, ordinarily a large number of the wafers 10 are disposed within a diffusion furnace at the same time; and it is desired to determine the excess carrier lifetime of the material before proceeding with further processing steps in the manufacture of a transistor or thyristor or other semiconductor device. Otherwise, a deficiency in excess carrier lifetime requirements may not be discovered until a device has been completely fabricated, in which case all of the process steps between the formation of the wafer of FIG. 1 and the final product may have been in vain.

The first step of the measurement process following formation of the P-type diffused layer 12 is to lap the underside 14 of the wafer 10 to expose the inner N-type material. This, then, produces a structure with a single P-N junction between the N-type material or main body of the wafer 10 and the outer P-type layer 12.

The next step in the process is to ultrasonically solder a contact onto the lapped surface 14. This step is shown in FIG. 3 where the wafer or body 10 is placed on a hot plate 16 heated by any suitable means, not shown. Preferably, a layer of material, such as paper 18, is disposed between the wafer 10 and the hot plate 16 to prevent mechanical damage to the wafer 10 during the ultrasonic soldering operation. Solder material, preferably a 50–50 tin-indium alloy, is deposited on the lapped surface 14 and the hot plate 16 heated to a temperature of about 120° C, which is sufficient to melt the solder on the lapped surface 14. In this process, the solder spreads out into a layer 20 which is preferably as large as possible without overlapping onto the P-type layer 12. The probe 22 of an ultrasonic transducer is inserted into the layer 20 as it is melted whereby the ultrasonic vibrations will break up any oxides on the lapped surface 14 and effect an intimate, low resistance contact between the metal and the N-type material 10. Because of the fact that the ultrasonic transducer 22 is employed, it is unnecessary to employ any fluxes in the solder 20.

As an alternative to inserting the probe 22 directly into the solder, the hot plate 16, for example, could be contacted by the probe, schematically illustrated at 24, of an ultrasonic transducer whereby the vibrations will be transmitted through the hot plate 16 to the wafer 10 and the solder 20. Still another possibility is to bring the probe 24 into contact with the body 10 itself.

Following formation of the contact 20, the wafer 10 is turned over as shown in FIG. 4 to expose the surface 26 thereof opposite the lapped surface 14. An amount of solder, again preferably a 50–50 tin-indium alloy, is deposited on the surface 26 and the hot plate heated to a temperature of 120° C whereby the solder will melt to form a contact 28. In this process, the probe 22 of an ultrasonic transducer is again introduced into the solder 28 as it melts in order to break up oxides on the surface. Preferably, the contact 28, unlike contact 20, is approximately 0.3 square centimeter in order to maximize current density during the open-circuit decay measurement while avoiding edge recombination effects. It is desirable to maximize measurement current density in order to achieve the highest injected carrier density from a given current pulse amplitude, which means that the contact area should be as small as possible. Again a paper or the like separator 18 is provided between the hot plate 16 and the previously-formed contact 20. This separator now serves to prevent lateral flow of the solder as well as serving as a mechanical cushion. At normal soldering temperatures, the paper will become scorched, but will not burn.

Following formation of the contacts by the process shown in FIGS. 3 and 4, the wafer, with the contact 20 on its underside, is placed on an electrode or plate 30 connected through lead 31 to one side of a pulsing network 32 and to one of the two vertical deflection plates 34 of a CRT tube schematically illustrated at 36. The contact 28, on the other hand, is connected through lead 38 to the other side of the pulsing network 32 and to the other vertical deflection plate 40 of the CRT tube 36. The output of the pulsing network is also connected to a sweep circuit 42 connected to the horizontal deflection plates 43 and 45 of the CRT tube 36. With this arrangement, pulses will be applied across the electrodes 20 and 28 by the pulsing network 32. As the trailing edge of each pulse from network 32 is reached, it actuates the sweep circuit 42 to cause the electron beam of the CRT tube 36 to sweep across its screen, shown in FIG. 6, from left to right.

A typical trace on the face of the CRT tube is shown in FIG. 6 wherein each of the blocks represents five microseconds. Following the trailing edge of each pulse from pulsing network 32, the electron beam of the CRT tube is caused to move from left to right as viewed in FIG. 6 over a total period of 50 microseconds, there being ten divisions on the face of the CRT tube. At the same time, the voltage decay across the electrodes 20 and 28 following application of a pulse is applied to the vertical deflection plates 40 and 34. This will produce the curves shown in FIG. 6, the upper curve 44 being that obtained when a measurement is taken at a temperature of about 25° C and the lower curve 46 being that obtained when the measurement is taken at a temperature of about 125° C. Note that in both cases the voltage decays rapidly from an upper value to a lower value. The slope of the curve 44 or 46, particularly at the start of the decay, is indicative of the excess carrier lifetime of the material. Thus, by observing the curve on the face of the CRT tube 36, excess carrier lifetime can be determined rapidly and efficiently by semi-skilled personnel.

Although the invention has been shown in connection with a certain specific embodiment, it will be readily apparent to those skilled in the art that various changes in method steps and form can be made to suit requirements without departing from the spirit and scope of the invention.

I claim as my invention:

1. In the method for determining excess carrier lifetime in a semiconductor body of one conductivity type, the steps of diffusing into said body a region of the opposite conductivity type to form a P-N junction, ultrasonically depositing a mass of metal consisting of an alloy consisting of, by weight, 50 percent tin and 50 percent indium, onto opposed surfaces of said body, the body having an opposite type semiconductivity at said surfaces, heating each of said mass of metal to a temperature not exceeding 120° C while ultrasonically preventing the formation of metal oxides on the surfaces on the metal masses, thereby forming electrical contacts on said surfaces of said regions of opposed conductivity type, and connecting said contacts to a source of electrical current pulses whereby the voltage decay following the termination of each pulse applied across said electrodes is observed on an oscilloscope to determine the excess carrier lifetime in said semiconductor body.

* * * * *